United States Patent [19]

Artman

[11] Patent Number: 4,467,759

[45] Date of Patent: Aug. 28, 1984

[54] COMBINED AIR INTAKE PASSAGE AND PRECOMBUSTION CHAMBER FOR INTERNAL COMBUSTION ENGINE

[76] Inventor: Noel G. Artman, 15830 Nicklaus La., Sun City, Ariz. 85351

[21] Appl. No.: 434,295

[22] Filed: Oct. 14, 1982

[51] Int. Cl.³ ............................................. F02B 23/00
[52] U.S. Cl. .................................. 123/263; 123/261; 123/260; 123/262; 123/275; 123/281; 123/282; 123/286; 123/293
[58] Field of Search ............... 123/289, 263, 281, 286, 123/282, 292, 275

[56] References Cited

U.S. PATENT DOCUMENTS

| | | | |
|---|---|---|---|
| 1,422,794 | 7/1922 | Smith | 123/282 |
| 1,705,374 | 3/1929 | Ricardo | 123/275 |
| 2,223,090 | 11/1940 | Boxan | 123/33 |
| 2,855,908 | 10/1958 | Pflaum | 123/286 |
| 2,884,913 | 5/1959 | Heintz | 123/28 |
| 3,077,868 | 2/1963 | Georges | 123/292 |
| 3,102,521 | 9/1963 | Slemmons | 123/32 |
| 3,543,735 | 12/1970 | Kenckenberg | 123/286 |
| 4,038,959 | 8/1977 | Takizawa | 123/282 |
| 4,175,501 | 11/1979 | Noguchi et al. | 123/282 |
| 4,182,280 | 1/1980 | Shekleton | 123/289 |
| 4,204,484 | 5/1980 | Miura | 123/282 |
| 4,289,097 | 9/1981 | Ward | 123/292 |
| 4,320,727 | 3/1982 | Artman | 123/263 |
| 4,320,728 | 3/1982 | Artman | 123/263 |

FOREIGN PATENT DOCUMENTS

| | | | |
|---|---|---|---|
| 2715943 | 10/1978 | Fed. Rep. of Germany | 123/32 C |
| 883106 | 6/1943 | France | 123/286 |
| 934579 | 10/1946 | France | 123/286 |
| 53-32209 | 3/1978 | Japan | 123/286 |

Primary Examiner—Ronald B. Cox

[57] ABSTRACT

Internal combustion reciprocating-piston engine precombustion chamber in which a mass of air or of air mixed with selective amounts of fuel and a spark-ignitable air-fuel mass are relatively segregatively compressed with the latter mass enveloping spark electrodes preparatory to ignition. The chamber is provided by recessing the air intake valve of an engine cylinder into the air intake passage for that cylinder so the chamber forms a section of that passage between the valve and the variable volume space above the piston in the cylinder. Contaminant products of combustion residual in the precombustion chamber upon completion of each combustion stroke are, during the next air intake stroke, vented into the cylinder variable volume space where they become mixed with the fresh intake air and any fuel entrained therein and then forced with this air back into the chamber pursuant to the ensuing compression stroke to be recycled during the next combustion stroke.

21 Claims, 3 Drawing Figures

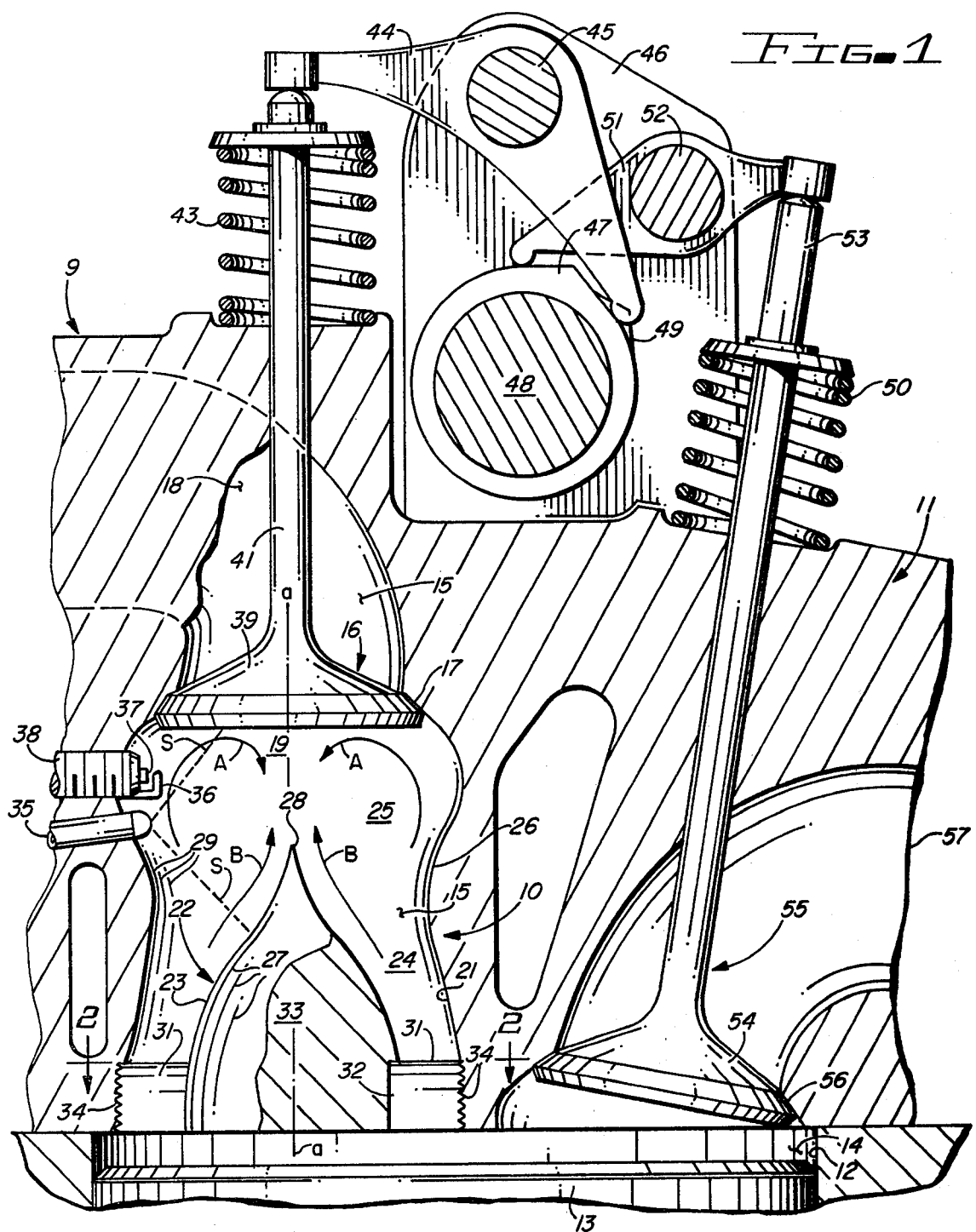
Fig-1
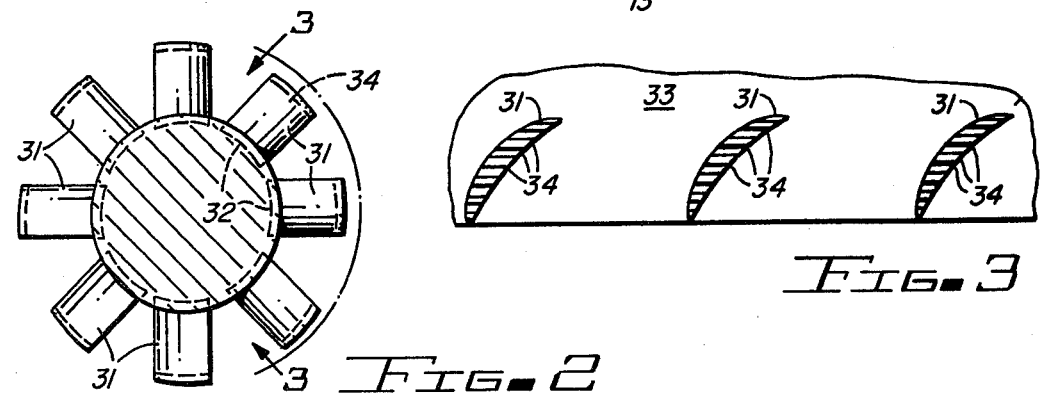
Fig-3
Fig-2

COMBINED AIR INTAKE PASSAGE AND PRECOMBUSTION CHAMBER FOR INTERNAL COMBUSTION ENGINE

SUMMARY OF THE INVENTION

This invention relates to internal combustion engines of the type wherein combustion is initiated in a combustion chamber auxiliary to and communicative with a variable volume space generally corresponding to what is commonly termed the combustion chamber of an orthodox Otto or four-stroke-cycle engine. The invention particularly concerns improvements in the construction and arrangement of parts of the auxiliary chamber that control the flow of air from the variable volume space into and within the chamber. This control is in a manner that causes rotation of the chamber-contained air about an axis of such chamber and arrangement of such rotating air into discrete rotating masses occupying respective adjacent positions along said axis. This control of the air makes it possible to mix fuel with one of these masses exclusively of or in greater amount than in the other to create with the one mass an ideal spark-ignitable air-fuel mixture, whereby ensuing combustion occurs more completely in an excess of oxygen existing in the other air mass and with less fuel to produce a given amount of energy under engine idle and part load conditions than if all of the air had received enough fuel to dependably spark-ignite. In this manner the invention provides for not only an improved fuel consumption characteristic but also for diminution of exhaust gas pollutants. Both air masses are mixable with combustion-sustaining quantities of fuel varying in amount to attain desired engine speed and power.

The species of structure herein disclosed involves improvements upon the structures disclosed in my pending application for U.S. patent filed Apr. 7, 1982, Ser. No. 366,446 for Precombustion Chamber for Internal Combustion Engine, and in my U.S. patents, U.S. Pat. No. 4,320,727 titled Process of Fuel Stratification Within and Venting of Engine Auxiliary Combustion Chamber, and U.S. Pat. No. 4,320,728 titled Engine Precombustion Chamber With Provisions for Venting Thereof and Fuel Stratification Therein. The improvements generally concern incorporation of the precombustion chamber within and as part of the air intake passage whereby the structure is simplified by using the normal air intake valve also for the chamber, thus preserving the 2-valve per cylinder character of the structure in contrast to the 3-valve per cylinder character of my prior structures. Details of these improvements and their distinction from the structures and operational characteristics disclosed in the above-identified application and patents will become apparent from the ensuing description with reference to the appended drawings and claims.

DESCRIPTION OF DRAWING FIGURES

FIG. 1 is a fragmentary view taken sectionally through the cylinder head and upper part of an engine cylinder, illustrating a precombustion chamber structure embodying a preferred form of this invention.

FIG. 2 is a plan view partly in section of the air flow control structure, taken at the line 2—2 of FIG. 1.

FIG. 3 is a fragmentary panoramic elevational view taken at the line 3—3 of FIG. 2.

DESCRIPTION AND EXPLANATION OF THE ILLUSTRATED FORM OF THE INVENTION

A precombustion chamber structure 10 embodying a preferred form of the invention is shown in FIG. 1 in the cylinder head 11 of a cylinder 12 which are parts of a 4-stroke cycle internal combustion engine 9. A piston 13 reciprocates conventionally in the cylinder pursuant to varying the volume of a variable volume space 14 in the cylinder between the piston and the cylinder head. Air inlet passage 15 communicating with the variable volume space contains an air inlet valve 16 of the poppet type having an annular seat 17 disposed between an upstream portion 18 of such passage and the precombustion chamber 10 which constitutes a section of such passage. Thus the precombustion chamber is interposed serially between the variable volume space and the upstream portion of the air inlet passage.

The chamber 10 has a principal axis a—a extending between opposite ends thereof and of which ends one, designated 19, is an air inlet end communicative with the upstream passage portion through the valve seat 17 which surrounds the axis a—a. The other end of the chamber, the lower end as viewed in FIG. 1, is in juxtaposed open communication with the variable volume space 14. The chamber has an inwardly-facing periphery 21 surrounding the axis a—a. Air flow control means 22 disposed within the chamber has a dome-like periphery 23 surrounding axis a—a and spaced radially thereof in opposed outwardly-facing relation with respect to a vestibule part of the inwardly-facing periphery 21 to form therewith an annular transverse sectioned vestibule 24 which is a portion of the chamber 10. This vestibule axially converges radially inwardly from a position adjacently to the lower end of chamber 10 upwardly toward a main chamber portion 25 of bulbous shape disposed between the valve seat and the vestibule. Main chamber portion 25 has an inwardly-facing peripheral girth about axis a—a in excess of the girth of valve seat 17 and of the inwardly-facing peripheral girth of the upper or converged end of vestibule 24, and joins with the vestibule in a manner forming a throat 26 or form of juncture through which the chamber portions are intercommunicative and wherein the chamber main portion periphery ceases to be convergent downwardly from the maximum girth section of such chamber portion. The throat 26 has an inwardly-facing peripheral girth also in excess of the valve seat girth but less than the maximum girth of said peripheries of the main chamber portion and the vestibule, thereby establishing for the inwardly-facing periphery 21 of the chamber 10 an hourglass-like configuration.

Axially disposed surface elements 27 of the dome-like periphery 23 are illustrated in FIG. 1 where it can be seen they entail a reverse curve starting near the base or lower large diameter end of such periphery and incurring termination of such periphery at an apex 28 adjacently to the chamber throat 26. Axially disposed surface elements 29 of the chamber inwardly-facing periphery are also illustrated in FIG. 1.

Air deflector vanes 31 having shank portions 32 anchored in the main body 33 of the air flow control means project radially from such body into and through the vestibule 24. The radially outer ends of these vanes are complementally threaded at 34 for attachment to the cylinder head 11; see FIGS. 2 and 3.

A fuel injector nozzle 35 is adapted to inject an evaporative fuel such as gasoline into the chamber 10. A typical conical spray pattern for such injected fuel is represented by the dotted lines S. This fuel is mixed with air in chamber 10 to form a spark ignitable mixture which is ignited by spark occurring between electrodes 36 and 37 of a spark plug 38.

Poppet valve 16 has a head 39 on a valve stem 41 and which is typically unseated from the valve seat 17 by a downward thrust on valve stem 41 against the force of a spring 43. This down thrust is provided through a rocker arm 44 pivoting on a bearing 45 supported by a bracket 46 mounted on the cylinder head. A cam 47 rotatable with an overhead camshaft 48 pivots the rocker arm to operate the valve 16 in timed relation with the engine crankshaft, not shown, the camshaft being driven by the crankshaft in any orthodox fashion. A second cam 49 on the camshaft pivots a rocker arm 51 on its bearing 52 to thrust an exhaust valve stem 53 downwardly against the force of spring 50 to unseat the head 54 of exhaust valve 55 from its seat 56 and establish communication of variable volume space 14 with an exhaust passage 57.

Operation of the engine with the above-described precombustion chamber is as follows: Starting with the downward air-intake stroke of piston 13 of this 4-stroke cycle engine, air is drawn inwardly through the upstream portion 18 of the air-intake passage 15 past the then open intake valve 16 and through the precombustion chamber 10 into the variable volume space 14 while the exhaust valve 55 is closed. Normal exhaust contaminants such as incompletely oxidized hydrocarbons retained in the chamber, during the preceding exhaust stroke of the piston, are swept from the chamber with the intake air into the variable volume space where they are dispersed within this air.

During the ensuing compression stroke of the piston, while the intake and exhaust valves are both closed, the air is forced from this contracting space past the air deflector vanes 31 farther into the precombustion chamber. While this air passes the vanes it is deflected thereby to flow helically into and through the vestibule 24 in the form of a tubular vortex spinning about the chamber axis a—a. As successive transverse sections of this upwardly advancing vortex reach the apex 28 of the air flow control means 22 they become solid or disc-like in contrast to annular and become part of a fluidal mass rotating about the chamber axis. This rotating mass is compressed attendant to being forced upwardly in the chamber main portion 25 by the vortex advancing upwardly in the vestibule until completion of the piston compression stroke.

Radially outer and inner surface portions of the air vortex of tubular columnar form rotating in the annular sectioned vestibule about the chamber axis a—a tend to respectively follow the peripheries 21 and 23. This is a phenomenon known as the Coanda effect which is defined in the Third Edition of Van Nostrand's Scientific Encyclopedia as follows: "The tendency of a jet of gas to follow the wall contour when discharged adjacent to a surface even when that surface curves away from the jet discharge axis is known as the Coanda effect." Because of this tendency of the radially outer portion of the tubular vortex to follow the hourglass-like periphery 21 of the chamber, part of the spirally advancing vortex entering the bulbous chamber portion 25 contiguously with the inwardly facing periphery thereof, upon reaching the upper end of the chamber will be deflected thereby downwardly contiguously about the chamber axis in the form of a reflux vortex as illustrated by the arrows A. This character of air flow in a precombustion chamber is explained in German Pat. No. 2715943 issued to Robert Bosch GmbH. Because of the tendency for the radially inner portion of the tubular vortex to follow the dome-like periphery 23 of the air flow control means 22, such periphery conduces convergence of at least a portion of the axially advancing vortex toward the chamber axis a—a. In this manner the air flow control means forms a central core-like portion of the vortex spiralling upwardly from the apex, as indicated by arrows B, in opposition to and with somewhat neutralizing effect upon the reflux vortex.

Because of this vortex flow control, downward movement of all parts of air initially in the upper chamber portion 25 at the beginning of the compression stroke as well as air entering this chamber portion during the compression stroke is effectively opposed portions of by vortex air succeedingly following into this chamber portion, wherefore the air so initially in this bulbous chamber portion, and fuel mixed therewith at a time later described to form therewith the readily spark-ignitable air-fuel mixture mass, is compressed into a space of diminished volume adjacently to the chamber upper end. Contributing to such segregation and retention of this compressed rotating mass in the upper part of the chamber is the bulbous shape of upper chamber portion 25; i.e., its greater radial dimension relatively to that of the throat 26 to thereby provide space into which such rotating mass is forced radially as it is being vertically flattened. This stratifying effect is also contributed to by the lower part of the chamber sidewall hourglass-like periphery 21 which in cooperation with the dome-like periphery 23 of the air flow control means determines the shape of the upwardly spiralling tubular air column so that this column, in addition to converging upwardly toward the chamber axis to produce radially inward momentum in opposition to the centrifugal force of the rotating column, also incrementally increases the column's downstream (upstream in reference to the direction of intake air flow through the air intake passage 15) cross-sectional dimension to correspondingly decrease its axial velocity and impact force when reaching the bulbous chamber portion. Due to the kinetic fluidal character of the entire mass rotating in the bulbous chamber portion about the axis a—a, there will be some interpenetration of fuel particles into axially adjacent portions of such mass, so there is no representation that the axially adjacent portions or masses will have cleavage-plane-like separation. However, vertical migratory movement of the fuel particals is restricted, and, none of the air delivered upwardly past the apex 28 can flow back into that part of the vortex advancing upwardly in the vestibule 24, wherefore, attendant to part load and low speed idle engine operation, when virtually only air will be forced from the variable volume space into the chamber vestibule during a major latter part of the compression stroke, there can be virtually no fuel particles in the substantial amount of air segregated in the vestibule.

Fuel injection, through the injector or nozzle 35, may occur during the air intake stroke and also during the compression stroke. Alternately, to obtain engine operation at low speed idle or at light load, injection may occur only during the compression stroke. Engine operation is herein described as it would be under control of a fuel supply system in which the injection starting time, during the cycle or stroke wherein injection starts, is varied whereas the injection period terminating time remains constant to incur greater quantities of fuel per injection correlated with respectively earlier injection starting times; that is, the earlier the starting time the greater the injected fuel quantity, irrespective of engine speed.

To attain maximum or rated load of the engine at any given speed, fuel injection will preferably commence at a predetermined time near start of the intake stroke. During this intake stroke the variable volume space 14 will be charged with air entering past the air intake valve 16 and through the combustion chamber 10 from which such air forces contaminant products of the preceding combustion into said space. The fuel which is injected in the form of a conical spray pattern such as S into the chamber will mix with and be borne by the air moving through the chamber into the variable volume space where mixing also occurs with the combustion products forced from the combustion chamber. The fuel delivery rate will be such that upon completion of the intake stroke the variable volume space will have been charged with an amount of fuel which, when later supplemented in the combustion chamber by fuel contained in such chamber prior to ignition, will produce maximum power for which the engine is rated at such speed. This amount of fuel in the variable volume space and the air mixed therewith, when compressed into the combustion chamber, will constitute an air-fuel mixture sufficiently rich in fuel to support combustion.

Engine operation at selectable part loads is accomplished by starting fuel injection at respectively later times during the air intake stroke, thus incurring less fuel per injection and less power output. With this mode of operation, irrespective of engine load magnitude, fuel injection started before termination of the air intake stroke will continue until start or even after start of the ensuing compression stroke to ensure the presence of fuel in the combustion chamber at the start of compression. During the compression stroke when the intake and exhaust valves are both closed, air in the chamber at the beginning of this stroke mixes with fuel contained in the chamber at termination of the preceding intake stroke and with any fuel injected into the chamber during the compression stroke. This air-fuel mixture or mass will be compressed foremost upwardly where it remains in the form of the reliably spark-ignitable air-fuel mass enveloping the electrodes 36 and 37. Ignition will occur at or near termination of the compression stroke.

Now considering what occurs during engine operation under the condition of no-load at idling speed, adequate fuel may be provided by injection starting at or near start of the compression stroke. Injection may continue from a short time prior to intake stroke termination and into the compression stroke cycle long enough to ensure there being in the chamber an amount of fuel which when mixed with the chamber-contained air will provide therewith an air-fuel mixture sufficiently rich in fuel to be readily spark-ignitable. This is significant because, as explained above, it is this mixture mass which is compressed foremost upwardly in the chamber to form the readily spark-ignitable mass enveloping the electrodes. At no time during the compression stroke will there be a significant amount of fuel in the variable volume space, wherefore the gaseous vortex advancing spirally upwardly in and through the vestibule will be composed principally of air which will contain combustion products, for recycling, forced with such air upwardly from said space. This vortex rotates and compresses the spark-ignitable air-fuel mixture upwardly into the form of a vertically flattened mass rotating about the axis a—a and enveloping the electrodes where the bulk of such mass remains until ignited. The energy obtained from burning this relatively small amount of fuel will be adequate to support no-load idle speed operation. At the time of ignition, that part of the chamber content below the ignited mass will consist principally of air providing an excess of oxygen for efficient burning of the fuel particles.

Engine operation during the compression stroke under partial and full load conditions differs from operation under no-load idle speed conditions, just described, only in the respect that at the beginning of the compression stroke the variable volume space will contain significant amounts of fuel mixed with the air respectively in relation to the amounts of power to be developed. As in the case of no-load idle speed operation, fuel injection may cease when the combustion chamber has received an amount of fuel which, when mixed and compressed with air then in the chamber, will provide with such air an air-fuel mixture that is reliably spark-ignitable. As the compression stroke progresses, fuel-laden air is forced from said space into the chamber vestibule where this air spirals upwardly in the form of said vortex to compress and position said reliably spark-ignitable mixture upwardly to form the spark-ignitable axially-flattened mass whirling about axis a—a while a rim portion of such mass envelops the electrodes. At the instant ignition occurs, particularly in the case of part load operation, that part of the chamber contents below said spark-ignitable mass will be relatively lean with fuel, so, as in the case of no-load idle speed operation, there will be an excess of oxygen for efficient burning of the fuel.

Since a readily spark-ignitable air-fuel mixture capable of sustaining no-load idle speed operation of the engine is created principally in the combustion chamber, even during part and full load operations when such mixture is created subsequent to establishment of part and full load air-fuel mixtures principally in the variable volume space, and said spark-ignitable mixture remains segregated while being compressed into enveloping relation with the electrodes, reliable ignition is assured not only for no-load idle operation but also for part load and full load operations without incurring a problem of over-rich fuel mixture at these increased loads.

The whirling motion of the spark-ignitable mass about the chamber axis a—a causes initially-ignited fuel to be borne circularly about the chamber to augment radial spreading of the flame front from the electrodes, thereby diminishing the time for complete burning of the fuel. The time for complete burning of the fuel is also diminished by this whirling air conducting fuel particles toward the spark-emitting electrodes. Hence the fuel burning process performed in and with this combustion chamber structure involves a character of air-fuel mixture control and movement for attaining desired rapid fuel burning heretofore recognized as being attainable by intense turbulence without regard to motion direction of different parts composing the turbulent mass.

The power stroke is effected by the burning fuel which establishes a flame front originating at and spreading from the electrodes 36 and 37 to increase the temperature and pressure in the combustion chamber, thereby forcing the resulting hot gases through the vestibule 24 into the variable volume space to force the piston downwardly.

During the ensuing exhaust stroke, products of the combustion incurred during the power stroke will be exhausted past the exhaust valve en route to the atmosphere. Those combustion products in chamber 10 will remain captive there during the exhaust stroke, to be later recycled as explained above.

I claim:

1. In an internal combustion engine having an air inlet passage communicative with a variable volume space within a cylinder of such engine, a precombustion chamber constituting a section of such passage and interposed serially between said space and an upstream portion of said passage, the chamber having a principal axis extending between opposite ends thereof and of which ends one is an air inlet end having a valve seat surrounding said axis and through which the chamber is communicative with said upstream portion and of which ends the other is in juxtaposed open communication with said space, the chamber having a radially inwardly-facing periphery portion surrounding said axis adjacently to said other end of the chamber, and air flow control means disposed captively within the chamber adjacently to said other end thereof and having a dome-like periphery surrounding said axis and spaced radially thereof in opposed outwardly-facing spaced relation with respect to said chamber periphery portion to form therewith an annular transverse sectioned vestibule of the chamber, the base of said dome-like periphery being disposed adjacently to said other end of the chamber, and the opposite end of such dome-like periphery being axially spaced remotely from said other end of the chamber relatively to said base end.

2. The combination set forth in claim 1, wherein the chamber has a main portion disposed between the valve seat and the vestibule, and wherein the vestibule axially converges from a position adjacently to said other end of the chamber in the direction of said main chamber portion.

3. The combination set forth in claim 1, wherein said chamber has a main portion disposed between the valve seat and the vestibule, and wherein the axially disposed surface elements of said inwardly facing periphery converge from a position adjacently to said other end of the chamber in the direction of said main chamber portion.

4. The combination set forth in claim 1, wherein the axially disposed surface elements of the dome-like periphery entail a reverse curve incurring termination of such periphery in an apex at said opposite end of such periphery.

5. The combination set forth in claim 4, wherein said chamber has a main portion disposed between the valve seat and the vestibule, and wherein the axially disposed surface elements of said inwardly facing periphery converge from a position adjacently to said other end of the chamber in the direction of said main chamber portion.

6. The combination set forth in claim 1, wherein the chamber has a main portion disposed between the valve seat and the vestibule, wherein the vestibule axially converges from a position adjacently to said other end of the chamber in the direction of said main chamber portion, and wherein said main chamber portion is of bulbous shape having a girth about said axis in excess of that of the valve seat, such bulbous main chamber portion having a juncture with the vestibule in the form of a throat of greater girth about said axis than the valve seat but restricted in girth relatively to that of the inwardly-facing peripheries of the main chamber portion and of the vestibule, thereby establishing an hourglass-like configuration of the inner periphery of said chamber.

7. The combination set forth in claim 6, wherein the axially disposed surface elements of the dome-like periphery of the air flow control means entail a reverse curve incurring termination of such periphery in an apex within the throat of said hourglass-like configuration.

8. In an internal combustion engine having an air inlet passage communicative with a variable volume space within a cylinder of such engine, a precombustion chamber constituting a section of such passage and interposed serially between said space and an upstream portion of said passage, the chamber having a principal axis extending between opposite ends thereof and of which ends one is an air inlet end having a valve seat surrounding said axis and through which the chamber is communicative with the upstream passage portion and of which ends the other is in juxtaposed open communication with said space, the chamber having adjacently to its air inlet end a main portion with a bulbous shaped radially inwardly-facing periphery of girth about said axis exceeding that of the valve seat, the chamber having adjacently to its other end a vestibule portion with a radially inwardly-facing periphery also of girth about said axis exceeding that of the valve seat, the chamber having, between said main and vestibule portions, a throat portion with an inwardly-facing periphery of less girth about said axis than that of the main and vestibule portions but exceeding that of the valve seat, and air flow control means disposed within the chamber adjacently to said other end thereof and having a dome-like periphery surrounding said axis and spaced radially thereof inwardly from and in opposed outwardly-facing spaced relation with respect to the inwardly-facing periphery of the vestibule chamber portion to complement the same in establishment of an annular transverse sectioned vestibule of the chamber, the base end of the dome-like periphery being disposed adjacently to said other end of the chamber, and the opposite end of the dome-like periphery being axially spaced from said other end of the chamber.

9. The combination set forth in claim 8, wherein the vestibule axially converges from a position adjacently to said other end of the chamber in the direction of said main chamber portion.

10. The combination set forth in claim 8, wherein the axially disposed surface elements of said inwardly-facing periphery of said vestibule portion converge from a position adjacently to said other end of the chamber in the direction of said main chamber portion.

11. The combination set forth in claim 8, wherein the axially disposed surface elements of the dome-like periphery entail a reverse curve terminating in an apex at said opposite end of such periphery.

12. The combination set forth in claim 11, wherein the axially disposed surface elements of said inwardly-facing periphery of the vestibule portion converge from a position adjacently to said other end of the chamber in the direction of said main chamber portion.

13. In an internal combustion engine having an air inlet passage communicative with a variable volume space within a cylinder of such engine, a precombustion chamber constituting a section of such passage and interposed serially between said space and an upstream portion of said passage, the chamber having a principal axis extending between opposite ends thereof and of which ends one is an air inlet end having a valve seat surrounding said axis and through which the chamber is communicative with the upstream passage portion and of which ends the other is in juxtaposed open communication with said space, the chamber having adjacently to its air inlet end a main portion of bulbous shape with a radially inwardly-facing periphery of girth about said axis exceeding that of the valve seat, the chamber having adjacently to its other end a vestibule portion annular in transverse section with a radially inwardly-facing periphery also of girth about said axis exceeding that of the valve seat, the chamber having, between said main and vestibule portions, a throat portion with an inwardly-facing periphery of less girth about said axis than that of the main and vestibule portions but exceeding that of the valve seat.

14. The combination set forth in claim 13, wherein there are, within said vestibule portion, air deflecting means spaced apart circumferentially about said axis and disposed to slant in the same direction spirally about said axis.

15. The combination set forth in claim 13, wherein there is air flow control means disposed within the vestibule portion and configured to cooperate therewith to create from air forced from said space through said vestibule a vortex encircling said axis and spirally contracting upstreamward through the vestibule toward the chamber main portion.

16. In an internal combustion engine having a main air inlet passage communicative with a variable volume space within a cylinder of such engine, a precombustion chamber constituting a section of such passage and interposed serially between said space and an upstream portion of said passage, the chamber having a principal axis extending between opposite ends thereof and of which ends one is an air inlet end having a valve seat surrounding said axis and through which the chamber is communicative with the upstream passage portion and of which ends the other is in juxtaposed open communication with said space, the chamber having adjacently to its air inlet end a main portion of bulbous shape with a radially inwardly-facing periphery of girth about said axis exceeding that of the valve seat, the chamber having adjacently to its other end a vestibule portion with a radially inwardly-facing periphery also of girth about said axis exceeding that of the valve seat, the chamber having, between said main and vestibule portions, a throat portion annular in traverse section with an inwardly-facing periphery of less girth about said axis than that of the main and vestibule portions.

17. The combination set forth in claim 16, wherein there are, within said vestibule portion, air deflecting means spaced apart circumferentially about said axis and disposed to slant in the same direction spirally about said axis.

18. The combination set forth in claim 16, wherein there is air flow control means disposed within the vestibule portion and configured to cooperate therewith to create from air forced from said space through said vestibule a vortex encircling said axis and spirally contracting upstreamward through the vestibule toward the chamber main portion.

19. In an internal combustion engine cylinder head for assembly with a cylinder of such engine and containing a main air inlet passage communicating through a face of the head with a variable volume space in a cylinder of the engine when the head is so assembled, a precombustion chamber constituting a section of said passage interposed serially between said face and an upstream portion of said passage, the chamber having a main portion contiguous with the upstream passage portion, the passage including a poppet valve seat interposed and communicative between the main chamber portion and the upstream passage portion, the main chamber portion having an axis surrounded by said seat and also having an inwardly-facing periphery surrounding said axis, said periphery having a section of maximum girth about said axis that exceeds the girth of the valve seat about said axis, the chamber also having an elongated vestibule portion annular in transverse section and surrounding said axis, said vestibule portion being disposed between the main chamber portion and the cylinder head face and communicative through said face with the variable volume space, the chamber portions intercommunicating through a throat therebetween downstreamward of the passage relatively to said maximum girth section of the main chamber portion, said throat having an inwardly facing periphery of minimum girth at least as great as the minimum girth of the valve seat, said inwardly-facing periphery being continuously contractively convergent axially of the main chamber portion from said maximum girth section thereof into said throat between the chamber portions, the vestibule portion having a radially inwardly facing periphery which is continuously contractively convergent axially of the chamber into said throat, and means disposed downstream of the passage relatively to the valve seat and providing for injection of fuel into the main chamber portion.

20. The combination set forth in claim 19, wherein there is means within and cooperable with the vestibule portion to direct at least a portion of air entering thereinto from the variable volume space into the main chamber portion helically about said axis.

21. The combination set forth in claim 19, wherein said axis extends into the vestibule chamber portion which has a periphery surrounding and facing radially inwardly toward said axis, and wherein there is means within and cooperative with the vestibule portion to direct air entering thereinto contiguously with its said periphery from the variable volume space helically about said axis into the main chamber portion.

* * * * *